United States Patent [19]

Bowerman et al.

[11] Patent Number: 4,489,043

[45] Date of Patent: Dec. 18, 1984

[54] MANUFACTURE OF MANGANOUS SULFATE SOLUTIONS

[75] Inventors: Paul D. Bowerman, Edmond; Thomas W. Clapper, Oklahoma City; William C. Laughlin, Edmond, all of Okla.

[73] Assignee: Kerr-McGee Chemical Corporation, Oklahoma City, Okla.

[21] Appl. No.: 577,996

[22] Filed: Feb. 8, 1984

[51] Int. Cl.³ .............................................. C01G 45/10
[52] U.S. Cl. .......................................... 423/49; 423/52; 423/605
[58] Field of Search ................... 423/49, 52; 75/121

[56] References Cited

U.S. PATENT DOCUMENTS

| | | | |
|---|---|---|---|
| 1,279,110 | 9/1918 | Haslup | 423/52 |
| 3,227,520 | 1/1966 | Samonides | 423/52 |
| 3,434,947 | 3/1969 | Steintveit | 204/119 |
| 3,493,365 | 2/1970 | Pickering et al. | 75/101 |
| 3,667,906 | 6/1972 | Sasaki | 23/145 |
| 3,864,118 | 2/1975 | Schumacher et al. | 423/49 |
| 4,285,913 | 8/1981 | Soni et al. | 423/50 |

FOREIGN PATENT DOCUMENTS 393341 12/1973 U.S.S.R. .............................. 75/121

Primary Examiner—Herbert T. Carter
Attorney, Agent, or Firm—William G. Addison; John P. Ward

[57] ABSTRACT

Manganese sulfate solutions of improved purity are prepared by digesting a combination of a reduced manganese ore with an aqueous acid solution in the presence of a particulate potassium-iron salt byproduct. The salt byproduct is the salt byproduct formed, in situ, by reaction of potassium impurity with ferric ion during digestion of a combination of a reduced manganese ore and an aqueous acid solution.

10 Claims, 1 Drawing Figure

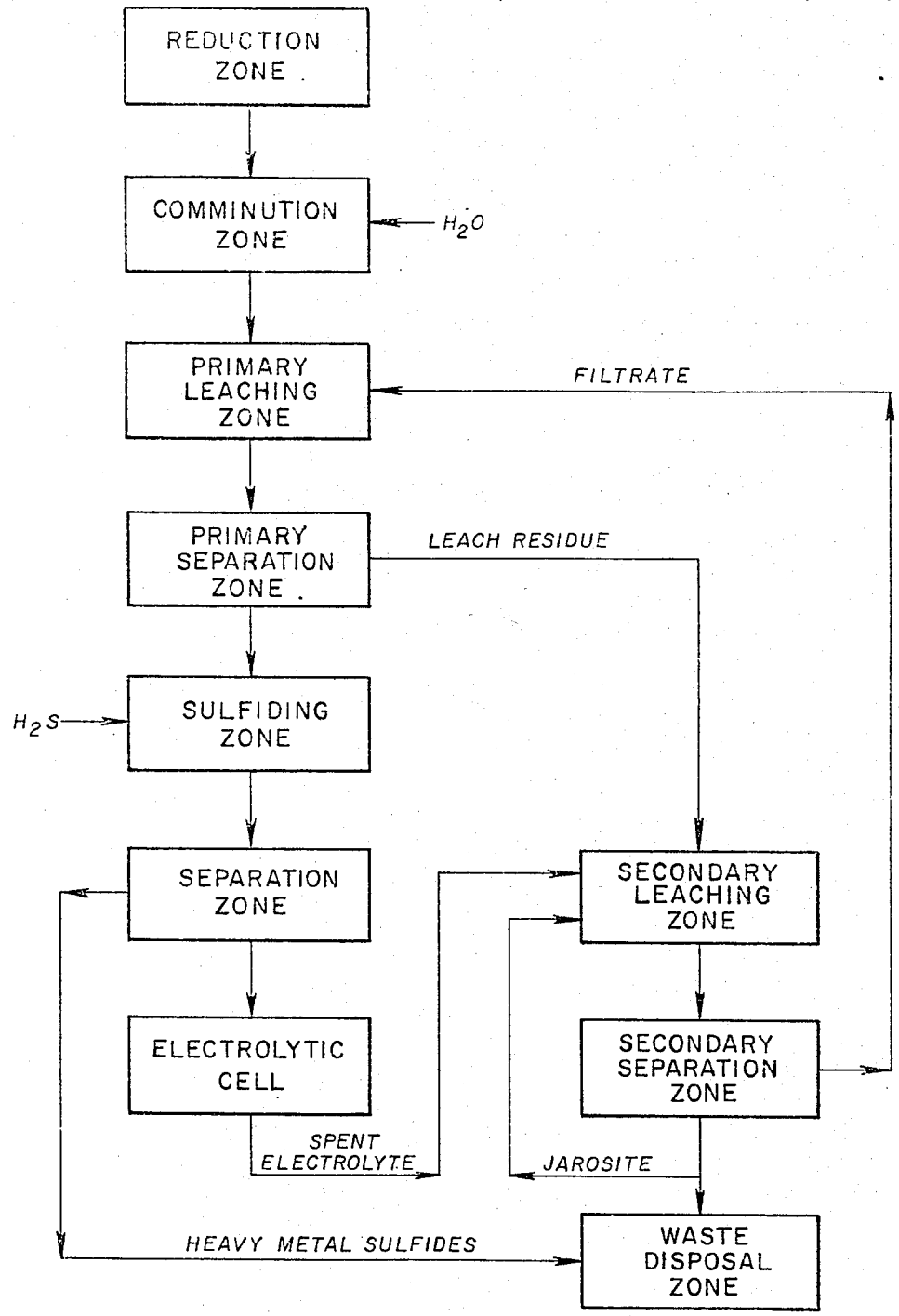

MANUFACTURE OF MANGANOUS SULFATE SOLUTIONS

CROSS REFERENCE TO RELATED APPLICATIONS

Aspects of the present invention are related to subject matter disclosed in co-pending applications entitled "METHOD OF PRODUCING MANGANESE SULFATE SOLUTIONS OF IMPROVED PURITY" Serial No. 577,995 and "PROCESS OF PRODUCING MANGANESE SULFATE SOLUTIONS", Serial No. 577,997, both co-pending applications filed on an even date herewith and both assigned to the same assignee as the present invention.

FIELD OF THE INVENTION

The present invention relates to improvements in the preparation of manganese sulfate solutions for use in the manufacture of electrolytic manganese dioxide. More particularly, the invention relates to improvements in processes for the preparation of manganese sulfate solutions containing low levels of potassium impurities.

BACKGROUND OF THE INVENTION

It is well known that manganese dioxide of a grade suitable for use as a depolarizer in dry cell batteries can be manufactured synthetically from manganese sulfate solutions by the electrolytic deposition of the dioxide onto a suitable anode. Also, it is known that the precursor manganese sulfate solutions can be prepared by the reduction or calcining and digestion or leaching of naturally occurring manganese ores such as those of the pyrolusite/cryptomelane type. However, a drawback to the use of such manganese ores of the cryptomelane type is the presence therein of high levels of potassium.

The presence of potassium impurity in electrolytic manganese dioxide adversely affects the latter's capability to function satisfactorily as a depolarizer in dry cell batteries. As a result, numerous solutions have been proposed for removing potassium impurity from electrolytic manganese dioxide, the majority of these relating to the removal of potassium impurity during the preparation of the precursor manganese sulfate solution. For example, in U.S. Pat. No. 3,667,906 there is disclosed a method of removing potassium impurity from naturally occurring manganese ores used in the preparation of the manganese sulfate electrolyte comprising washing a reduced or calcined manganese ore with hot water to remove soluble potassium prior to subjecting said reduced or calcined manganese ore to subsequent acid leaching and separation steps.

U.S. Pat. No. 4,285,913 offers yet another method for producing manganese sulfate electrolyte solutions containing reduced levels of potassium. In this patent, there is described a process wherein reduced or calcined manganese ore containing potassium impurity is leached with a liquor comprising spent electrolyte (i.e., an aqueous solution containing sulfuric acid and manganese ion) to which has been added a source of iron to provide soluble ferric ions. The leaching process is carried out under such specific conditions of pH, time and temperature as to yield a mixture of digested ore and manganese sulfate solution which solution is stated to have reduced levels of potassium impurity. Subsequent treatment of this mixture with additional reduced or calcined ore to raise the pH of the mixture and to precipitate the remaining iron followed by a liquid/solid separation step thus provides an electrolyte suited to the preparation of electrolytic manganese dioxide.

Although not mentioned by U.S. Pat. No. 4,285,913, the invention therein described apparently makes use of the "jarosite process", named after the resulting iron precipitate, as described in U.S. Pat. Nos. 3,434,947 and 3,493,365 and employed in the zinc industry for the recovery of zinc and other valuable metals by electrolytic processes. In this process, small amounts of ammonium, sodium or potassium ion are added to a leach liquor resulting from the leaching of a zinc calcine, neutralized and the iron impurity present in the solution precipitated out as jarosite having the formula

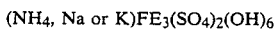

according to the following reaction:

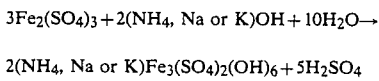

Of course, in U.S. Pat. No. 4,285,913, the objective is to remove potassium impurity, and this is apparently accomplished by the addition of a source of iron to the leach liquor.

While the processes of the above-noted patents may be effective in substantially reducing the levels of potassium impurity they still leave much to be desired from the standpoint of the rate at and extent to which potassium removal can be achieved. The present invention provides improvements over the processes noted above and particularly the process described in U.S. Pat. No. 4,285,913.

BRIEF DESCRIPTION OF THE DRAWING

The single FIGURE is a flow diagram illustrated a typical process for preparing manganese sulfate solutions encompassing the use of the invention herein described and claimed.

SUMMARY OF THE INVENTION

As described in greater detail hereinafter, the present invention relates to improvements in processes for the production of manganese sulfate solutions containing low levels of potassium impurity. In general, processes to which the improvements of the present invention are applicable may either be continuous or batch processes involving a series of process steps including, among others, reduction of a naturally occurring manganese ore containing potassium impurity, leaching or digesting the reduced ore with an aqueous acid solution and separation and recovery of the resultant manganese sulfate solution. Specifically, the processes to which the improvements of the present invention are applicable are those which include the features of reducing a manganese ore containing potassium impurity followed by forming and digesting a mixture of said reduced ore with an aqueous acid solution selected from the group consisting of aqueous sulfuric acid and aqueous spent cell electrolyte containing sulfuric acid at elevated temperatures in the presence of ferric ion to produce a manganese sulfate solution and form, in situ, a potassium-iron salt byproduct. The improvements of the present invention comprise recovering said potassium-iron salt byproduct either alone or in admixture with digested ore residue from the digestion zone and recycling at least a portion of the same back to the digestion zone. It has been discovered that by recycling said potassium-iron salt byproduct either alone or in admixture with digested ore residue back to the digestion zone and contacting the same with a fresh mixture of ore and aqueous acid solution therein, an accelerated rate of formation of said salt byproduct (hereinafter referred to as "jarosite") can be achieved resulting in a greater degree of removal of potassium impurity from the manganese sulfate cell feed solution.

DETAILED DESCRIPTION OF THE INVENTION

As set forth hereinabove, the present invention comprises improvements in the production of manganese sulfate solutions useful in the manufacture of electrolytic manganese dioxide. The manganese sulfate solutions prepared through the use of the present invention are characterized by reduced levels of potassium as an impurity.

Specifically, the invention comprises contacting a particulate potassium-iron salt byproduct, i.e., jarosite crystals, or admixtures of said salt byproduct with digested ore residue with fresh digestion mixtures of reduced manganese ore and aqueous acid solution in the presence of ferric ion in a digestion or leaching zone. The particulate jarosite crystals (or admixtures thereof) employed in the practice of this invention are those prepared, in situ, by the reaction of potassium ion with ferric ion during a prior digestion or leaching of a mixture of reduced manganese ore with an aqueous acid solution such as that selected from the group consisting of aqueous sulfuric acid and aqueous spent cell electrolyte containing sulfuric acid. It has been found that by contacting the particulate jarosite crystals or the above described admixture thereof with said fresh mixtures of reduced ore and aqueous acid solution in a digestion or leaching zone the induction period associated with the reaction of potassium ion with ferric ion to form jarosite can be significantly reduced. Reduction of this induction period results in an increased rate of reaction between the potassium ion and ferric ion and a concomitant decrease in the level of potassium impurity remaining in the manganese sulfate cell feed solution.

The amount of particulate jarosite crystals or admixture of said jarosite crystals and digested ore residue contacted with the fresh mixture of reduced ore and aqueous acid solution in the presence of ferric ion in the digestion or leaching zone can vary widely. In general, the amount will be such as to provide a concentration of said particulate jarosite crystals in the aqueous acid solution of the fresh digestion mixture of at least about 10 grams per liter of said aqueous acid solution. Preferably, the amount should range from about 10 grams to about 80 grams of the jarosite crystals per liter of said aqueous acid solution.

The particulate jarosite crystals employed in the present invention are those produced in situ in the process and having surface areas ranging from about 4.0 to about 12.0 square meters per gram. One set of conditions useful in forming the particulate jarosite crystals is disclosed in U.S. Pat. No. 4,285,913, the teachings of which are incorporated herein by reference. Therein it is disclosed that the formation of the jarosite crystals is dependent upon such factors as the pH and temperature of the reduced ore/leach liquor mixture in the leach vessel. More particularly, it is disclosed that to form and precipitate the jarosite crytals it is necessary to maintain the pH of the mixture at between 1 to about 2 and the temperature between 60° C. and 90° C.

The above-referenced patent also discloses that the extent of potassium removal is dependent upon the time allocated to the reaction. For example, it is taught that to effect the desired degree of removal of potassium impurity, reaction times ranging between 1 and 4 hours are required with a reaction time of at least three hours being preferred.

Generally, it has been found that a broader range of temperature and pH conditions can be employed when employing the improvements of the present invention. Thus, it has been observed that temperatures ranging from about 45° up to the boiling point of the leach mixture in said digestion or leaching zone can be employed. However, temperatures ranging from about 45° C. to about 95° C. are preferred. Also, pH values of the mixture in said leaching or digestion zone ranging from about 0.5 to about 3.5 can be used with good results when the digestion or leaching reaction is carried out in the presence of said jarosite crystals. Preferred pH values of the mixture will, however, range from about 1.0 to about 3.0.

As demonstrated in the examples which follow, the present invention provides an unexpected advantage over the process described in U.S. Pat. No. 4,285,913 in that reaction times for the formation of the jarosite can be reduced significantly. For example, it has been observed that by the addition of jarosite crystals to the mixture of reduced ore and acid solution in the digestion or leaching zone as herein described, the time required to reduce the amount of potassium impurity to any given level can be decreased significantly. From Example I set forth hereinbelow, it can be seen that by adding jarosite crystals to an acidic manganese sulfate solution containing potassium ions and ferric ions, the solution having a pH of between about 2.0 and about 3.0, the percent of total potassium ion removed was 50 weight percent after 15 minutes whereas no potassium had been removed at the end of the same period and only about 5.5 weight percent removed by the end of the test period (120 minutes) in the absence of the jarosite crystals.

The improvements comprising the present invention are applicable to any process employed in the production of manganese sulfate solutions and having as a feature thereof a digestion or leaching step in which a reduced or calcined manganese ore is leached with an aqueous solution of a strong mineral acid and particularly aqueous sulfuric acid or spent electrolyte containing sulfuric acid. Such processes generally will include a series of process steps. The single FIGURE, which as noted above, is a flow diagram illustrative of one such process to which the improvements of the present invention are applicable. Referring to the FIGURE, a potassium containing manganese ore such as one of the pyrolusite/cryptomelane type is introduced into the Reduction Zone wherein it is heated at temperatures ranging from about 400° C. to about 1200° C. Heating of the ore is continued for a period of time sufficient to reduce substantially all of the manganese (IV) ion in the ore to manganese (II) ion.

The reduced ore then is transferred to the Comminution Zone wherein it is ground to particles of which at least about 80 weight percent will be of a size that will pass a 200 mesh (U.S. Standard) screen. Such comminution may be accomplished by any number of conventional means. Generally ball milling is the means most commonly employed. Normally a liquid medium such as water is added to the ball mill during the grinding operation to produce a slurry of the reduced ore which readily is pumpable to the Primary Leaching Zone comprising one or more digestion or leaching vessels.

In the Primary Leaching Zone, the slurry of reduced ore is combined with an aqueous acid solution to dissolve or leach out the manganese (II) ion in the ore in the form of soluble manganese sulfate. In the process illustrated by the FIGURE, the aqueous acid solution employed in the Primary Leaching Zone is the aqueous acid filtrate from the Secondary Separation Zone which filtrate contains sulfuric acid and is derived from the spent cell electrolyte fed to the Secondary Leaching Zone. However, it is to be understood that the aqueous acid solution employed in the Primary Leaching Zone also can include fresh aqueous sulfuric acid or spent cell electrolyte piped directly to the Primary Leaching Zone from the Electrolytic Cell.

The process conditions employed in this Primary Leaching Zone generally are rather mild. For example, the pH of the leach mixture will range from about 4.0 to about 7.0 while ambient temperatures or temperatures ranging from about 35° C. to about 55° C. are employed. The leach mixture, comprised of the leach liquor and a leach residue, then is conveyed to the Primary Separation Zone where the leach liquor and leach residue are separated. The leach liquor is purified in the Sulfiding Zone by treatment, for example, with hydrogen sulfide to remove heavy metal impurities which are filtered out in the Separation Zone. The purified and filtered leach liquor then is transferred to the Electrolytic Cell.

The leach residue remaining in the Primary Separation Zone, which leach residue contains residual manganese (II) values, is conveyed and subjected to an additional leaching step in the Secondary Leaching Zone. This additional leaching step is carried out under considerably more stringent conditions than those employed in the Primary Leaching Zone. In this additional leaching step the leach residue is combined with an aqueous acid solution to provide a leach mixture having a higher free acid content than the leach mixture employed in the Primary Digestion Zone. This aqueous acid solution and the leach residue from the First Separation Zone are combined in such amounts to give a leach mixture in the Secondary Leaching Zone having a solution pH ranging from about 1.0 to about 3.0 and preferably from about 2.1 to about 2.6. Conveniently, the aqueous acid solution employed will be spent electrolyte from, for example, the Electrolytic Cell. This spent electrolyte generally will have a free sulfuric acid content ranging from about 10.0 to about 50.0 grams of acid per liter of solution.

Temperatures employed in the Secondary Leaching Zone are also higher than those employed in the Primary Leaching Zone and can range from about 45° C. up to the boiling point of the solution. Normally, however, temperatures ranging from about 45° C. to about 95° C. will be employed.

On completion of the secondary leaching step the resultant leach mixture, comprised of a leach liquor containing manganese sulfate, sulfuric acid, etc. and a leach residue of an admixture of particulate byproduct jarosite and digested ore residue, are separated in the Secondary Separation Zone. The leach liquor or filtrate is returned to the Primary Leaching Zone wherein it is combined with additional reduced ore to repeat the process and to precipitate out of solution any unreacted ferric ion. In a conventional process, the leach residue comprised of the admixture of jarosite crystals and digested ore residue normally would be neutralized and discarded at this point. However, in one embodiment in the practice of the present invention, at least a portion of the leach residue separated from the resultant leach mixture in the Secondary Separation Zone is removed and returned or recycled to the Secondary Leaching Zone. Reference again is made to the single FIGURE wherein this is illustrated. The return or recycle of at least a portion of the leach residue to the Secondary Leaching Zone provides the jarosite crystals necessary to effect an increase in the rate of jarosite formation and removal of potassium impurity taking place in said vessel. Again, the amount of jarosite crystals, in the form of said leach residue, returned to the Secondary Leaching Zone will be an amount sufficient to provide a concentration of said crystals in the aqueous acid solution in the Secondary Leaching Zone of at least about 10 grams per liter of the aqueous acid solution and preferably a concentration ranging from about 10 grams to about 80 grams per liter of said solution.

The source of ferric ion employed in forming the jarosite crystals in the Secondary Leaching Zone may be the reduced or calcined ore itself or ferric ion derived from an external source said external source preferably being added to the leach mixture in the Secondary Leaching Zone. Representative examples of such external sources of ferric ion include metallic iron and ferromanganese dissolved in acid and oxidized with air, $H_2O_2$, $MnO_2$, $NaClO_3$ and the like and various iron salts such as ferric and ferrous sulfates, nitrates, chlorides and the like. The use of an external source of ferric ion will be necessary only in the event the manganese ores employed do not contain a sufficient amount of ferric ion to provide for the reduction of the potassium impurity to desired levels. Generally the amount of ferric ion present in the leach mixture in the Secondary Leaching Zone will be an amount sufficient to provide a mole ratio of $Fe^{+3}$ to $K^{+1}$ of at least 1:1. Normally, however, best results are achieved at mole ratios ranging from about 4:1 or greater with ratios ranging from about 8:1 to about 12:1 being preferred.

The following examples illustrate the application of the invention described herein and are not intended to limit the scope and spirit of the invention.

EXAMPLES 1-6

A series of experiments was carried out to demonstrate the effectiveness of the use of crystals of jarosite to enhance the removal of potassium impurity from a leach liquor. In each experiment, the leach liquor employed was an aqueous solution of sulfuric acid having a pH of 2.6 and containing 36 grams per liter of manganese, as manganese (II) ion and 180 milligrams per liter of potassium ion.

Three hundred milliliters (ml) of the above leach liquor were added to each of six 500 ml round bottom flasks equipped with means for heating and stirring. To each flask was then added a quantity of ferric sulfate and jarosite, $KFe_3(SO_4)_2(OH)_6$, crystals and the resultant mixtures heated with continuous stirring for a period of two hours. During this period, aliquot samples of the reacting mixtures were taken every 15 minutes and analyzed for potassium concentration. Table I contains data as respects temperatures, ferric ion concentrations and amounts of jarosite crystals employed in this series of experiments.

TABLE I

| Experiment No. | 1 | 2 | 3 | 4 | 5 | 6 |
|---|---|---|---|---|---|---|
| Temp., °C. | 95 | 95 | 50 | 50 | 50 | 70 |
| Jarosite Conc., g/l | 0 | 13 | 13 | 80 | 13 | 13 |
| $Fe^{+3}$ Conc., g/l | 1.6 | 1.6 | 1.6 | 1.6 | 0.5 | 1.6 |
| Time, hrs. | \multicolumn{6}{c}{Potassium Ion Concentration, mg/l} |
| 0.00 | 180 | 180 | 180 | 180 | 180 | 180 |
| 0.25 | 180 | 90 | 120 | 71 | 160 | 110 |
| 0.50 | 180 | 36 | 83 | 28 | 150 | 64 |
| 0.75 | 170 | 23 | 57 | 3.5 | 138 | 38 |
| 1.00 | 170 | 16 | 42 | 0.4 | 130 | 27 |
| 1.50 | 165 | 10 | 26 | 0.3 | 110 | 16 |
| 2.00 | 170 | 4 | 17 | 0.3 | 100 | 10 |

From the above series of experiments the beneficial effects of the use of jarosite crystals to remove potassium impurity from a leach liquor readily are apparent. For example, in Experiment No. 1, wherein no jarosite crystals were employed, only 10 mg/l of potassium ion (representing a 5.5% reduction in potassium ion concentration) were removed after two hours of heating and stirring. On the other hand, in those experiments (Nos. 2–6) wherein jarosite crystals were added to the leach liquor, reductions in potassium ion ranging from 80 mg/l to 179.7 mg/l (representing from 44.4% to greater than 99% removal) were achieved by the end of this same period of time.

While the present invention has been described with respect to what at present is considered to be the preferred embodiments thereof, it is to be understood that changes or modifications can be made in the process described without departing from the spirit or scope of the invention as defined by the following claims.

What is claimed is:

1. In a process for producing manganese sulfate solutions containing low levels of potassium impurity from manganese ores containing potassium impurity for use in the manufacture of electrolytic manganese dioxide, said process including reducing said manganese ore, combining said reduced ore with an aqueous acid solution selected from the group consisting of aqueous sulfuric acid and spent aqueous electrolyte containing sulfuric acid and digesting said combination at elevated temperatures in the presence of ferric ion to produce a manganese sulfate solution and a particulate potassium-iron salt byproduct the improvements which comprise:
   A. contacting a portion of said potassium-iron salt byproduct, with a fresh combination of said reduced ore and aqueous acid to form a mixture, said mixture having a solution pH ranging from about 0.5 to about 3.5 and
   B. digesting the mixture of said fresh combination and said salt byproduct at elevated temperatures to produce a manganese sulfate solution and to enhance the reaction between the potassium impurity and ferric ion and the removal of said potassium impurity as potassium-iron salt byproduct from the manganese sulfate solution.

2. The improvements of claim 1 wherein said mixture has a solution pH ranging from about 1.0 to about 3.0.

3. The improvements of claim 1 wherein the mixture of said fresh combination and said salt byproduct is digested at temperatures ranging from about 45° C. to about 95° C.

4. The improvements of claim 1 wherein the portion of said salt byproduct contacted with said fresh combination of reduced ore and aqueous acid solution in the presence of ferric ion is an amount sufficient to provide a concentration of said salt byproduct in said aqueous acid solution of at least about 10 grams of said salt byproduct per liter of said aqueous acid solution.

5. The improvements of claim 4 wherein the portion of said salt byproduct is an amount sufficient to provide a concentration of said salt byproduct in said aqueous acid solution ranging from about 10 grams to about 80 grams of said salt byproduct per liter of said aqueous acid solution.

6. The improvements of claim 1 wherein said salt byproduct is in admixture with a digested ore residue.

7. The improvements of claim 1 wherein the molar ratio of ferric ion to potassium impurity, as potassium ion, in said mixture of said fresh combination and said salt byproduct ranges from about 1:1 to about 12:1.

8. The improvements of claim 7 wherein the molar ratio of ferric ion to potassium ion impurity in said mixture of said fresh combination and said salt byproduct ranges from about 4:1 to about 12:1 and preferably from about 8:1 to about 12:1.

9. The improvements of claim 1 further comprising continuously separating said manganese sulfate solution from said particulate potassium-iron salt byproduct and recycling a portion of said salt byproduct to a digestion zone wherein said salt byproduct is contacted with a fresh combination of said reduced ore and aqueous sulfuric acid solution or spent aqueous electrolyte containing sulfuric acid in the presence of ferric ion.

10. The improvements of claim 1 wherein the particles of potassium-iron salt byproduct contacted with the additional amount of said combination have a surface area ranging from about 4.0 to about 12.0 square meters.

* * * * *